US012295899B1

(12) United States Patent
Sheng

(10) Patent No.: US 12,295,899 B1
(45) Date of Patent: May 13, 2025

(54) MAGNETIC PULSE RECIPROCATING TYPE MASSAGER

(71) Applicant: Guohong Sheng, Ji'an (CN)

(72) Inventor: Guohong Sheng, Ji'an (CN)

( * ) Notice: Subject to any disclaimer, the term of this patent is extended or adjusted under 35 U.S.C. 154(b) by 0 days.

(21) Appl. No.: 18/811,149

(22) Filed: Aug. 21, 2024

(51) Int. Cl.
*A61H 19/00* (2006.01)

(52) U.S. Cl.
CPC ..... *A61H 19/44* (2013.01); *A61H 2201/1207* (2013.01); *A61H 2201/1669* (2013.01); *A61H 2201/169* (2013.01)

(58) Field of Classification Search
CPC ........ A61H 19/00; A61H 19/30; A61H 19/32; A61H 19/34; A61H 19/40; A61H 19/44; A61H 19/50; A61H 23/02; A61H 2023/0218
See application file for complete search history.

(56) References Cited

U.S. PATENT DOCUMENTS 11,259,987 B1 * 3/2022 Chen ...................... A61H 19/34
12,064,386 B1 * 8/2024 Yan ........................ A61H 23/02
2013/0281776 A1 * 10/2013 Levy ...................... A61H 23/02 600/38
2015/0148592 A1 * 5/2015 Kanbar .................. A61H 19/34 600/38
2016/0262973 A1 * 9/2016 Giraud ..................... A61N 5/06
2024/0382372 A1 * 11/2024 Zhou .................... A61H 23/006

* cited by examiner

*Primary Examiner* — Victoria Murphy
*Assistant Examiner* — Savannah L Gabriel
(74) *Attorney, Agent, or Firm* — Justin Lampel

(57) ABSTRACT

The invention discloses a magnetic pulse reciprocating movement type massager, which belongs to the field of a massage device. The front end of this massager is connected with a front shell and its back end is connected with a rear shell. In its front shell, there installs a reciprocating magnetic pulse beating mechanism. The two ends of the beating mechanism extend out of the two sides of the front shell. By controlling pulse current output of the circuit board to create a magnetic field to the magnet at the center of coil, which makes the magnetic pulse jumping mechanism of this massager to do linear reciprocating movement. This mechanism can wiggle in all directions. When compared with the traditional vibrators and other massagers with different movement methods, it can better meet customer's using habit.

21 Claims, 9 Drawing Sheets

A-A

B-B

MAGNETIC PULSE RECIPROCATING TYPE MASSAGER

TECHNICAL FIELD

The invention relates to the field of massage device, in particular to a magnetic pulse reciprocating movement type massager.

BACKGROUND

Massagers currently on the market use a simple single-point vibration combined with a massage stick, and the massage stick can take a variety of styles. Moreover, the front end of the existing massager generally does not have a motion device, the style is relatively single, and the using experience is poor. Therefore, the inventor designed a magnetic pulse massage mechanism, applied to the massager.

CONTENT OF INVENTION

The invention aims to create a magnetic pulse reciprocating motion type massager for solving the problems mentioned above.

The invention realizes the above purpose through the following technical schemes:

The reciprocating magnetic pulse type massager comprises a main body, and the front end of the massage body is connected with a front shell and a rear end is connected with a rear shell;

The front shell is provided with a magnetic pulse beating mechanism capable of making reciprocating motion, and the two ends of the magnetic pulse beating mechanism extend out of the two sides of the front shell.

As an optimal option, the magnetic pulse beating mechanism comprises a ring holder, a movable shell and a magnet. The ring holder is fixedly connected with the front shell, and wound with a coil. The middle part of the movable shell is arranged on the inside of the ring holder;

The movable shell is provided with a sliding channel along its axis, and the magnet is arranged in the sliding channel and can move reciprocally along the sliding channel.

As an optimal option, the outer side of the movable housing is covered with a silicone sleeve.

As an optimal option, the movable housing is a spindle shape with two large ends and a thin center. The two large ends are located on both sides of the ring holder.

As an optimal option, one end of the movable housing is provided with a removable end cover.

As an optimal option, the magnetic pulse beating mechanism comprises a ring holder and a silicone sleeve, and the ring holder is fixed connected with the front shell and wound with a coil;

The silicone sleeve activity is installed on the inside of the ring holder, and the silicone sleeve is provided with a magnet capable of doing reciprocating movement.

As an optimization, the rear housing is provided with a control circuit board and a battery, and the control circuit board is connected with a coil, and the battery is connected with the control circuit board;

The battery outputs DC current to the control circuit board. The control circuit board generate pulsating current to the coil which drives the magnet to do reciprocating motion.

As a preferred option, the front shell comprises a first shell and a second shell. The second shell is clamped with the first shell, and the first shell and the second shell are provided with a notch to the clamped to form an opening at both ends of the magnetic pulse beating mechanism.

As a preferred option, a swinging massage mechanism is also installed in the rear housing.

As an optimal option, the swinging massage mechanism comprises a motor, a screw, a gear, a crank, a connecting rod and a tongue;

The output shaft of the motor is connected with the screw, and the screw is engaged with the gear. One end of the gear is connected with the housing, and the other end is connected with the crank. The eccentric position of the crank is connected with one end of the connecting rod through the crank arm, and the other end of the connecting rod is connected with the tongue. The tongue is assembled with the rear housing through the rotating shaft. The joint tongue extends out of the opening of the rear shell; The connecting rod reciprocates with the rotation of the crank and drives the tongue to swing or pull back and forth.

As an optimal option, the tongue piece comprises a tongue piece body, a rotating shaft sleeve and a connecting part, and the tongue piece body, a rotating shaft sleeve and a connecting part are integrated;

Wherein, the connecting part is connected with the connecting rod through the connecting pin. The rotating shaft sleeve is rotationally connected with the rotating shaft; and the tongue piece body is shaped to extend the rear shell opening outside.

As an optimal option, the gear is rotationally connected to the rear housing through a bearing.

As an optimization, the crank and the crank arm are formed in a unibody; the connecting rod is connected with the crank arm through the connecting pin, and the crank is connected with the gear through the fixing screw.

As an optimal choice, the motor adopts a DC motor.

As a preferred option, the outer sides of the front shell, the massage body and the back shell are wrapped with a silicone shell.

Beneficial effect is this invention lays on by controlling the circuit board output pulse current to the coil cutting ring center magnet magnetic field, the magnetic pulse beating mechanism of the massager can do linear reciprocating movement, can do four directions eccentric swing motions. Compared with the traditional vibrator and other products of different motion methods, this massager is more close to the customer's using habits and can do more linear motion.

DESCRIPTION OF THE FIGURES

In order to more clearly state the technical scheme in the embodiment of the invention or the prior art, the following is a brief introduction of the drawings required to be used in the description of the embodiment or the prior art. It is obvious that the drawings described below are only some embodiments of the invention. For ordinary technicians in the field, without creative labor, Other drawings can also be obtained from these drawings.

The drawings are marked as follows.

Figure 1:
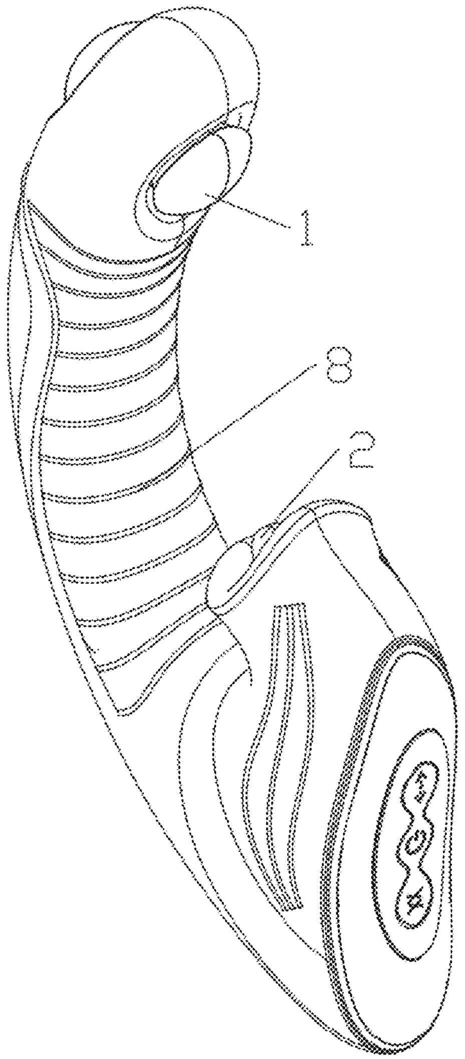
FIG. 1 is a stereogram of the magnetic pulse reciprocating type massager of the invention.
Figure 2:
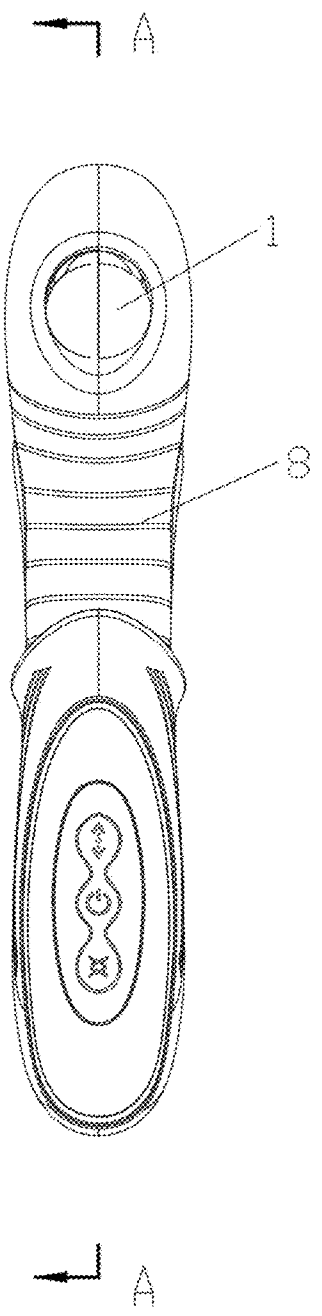
FIG. 2 is the main view of the magnetic pulse reciprocating type massager of the invention.
Figure 3:
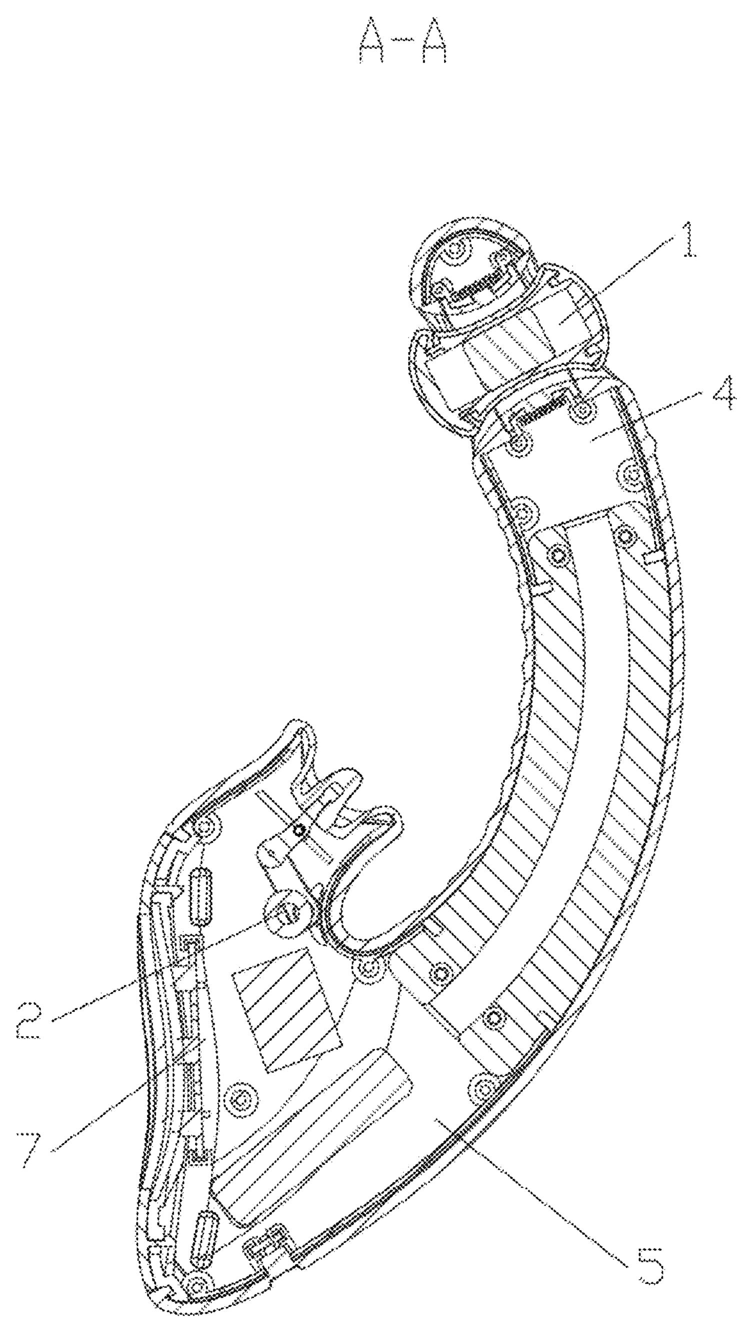
FIG. 3 is an A-A section view of FIG. 2.
Figure 4:
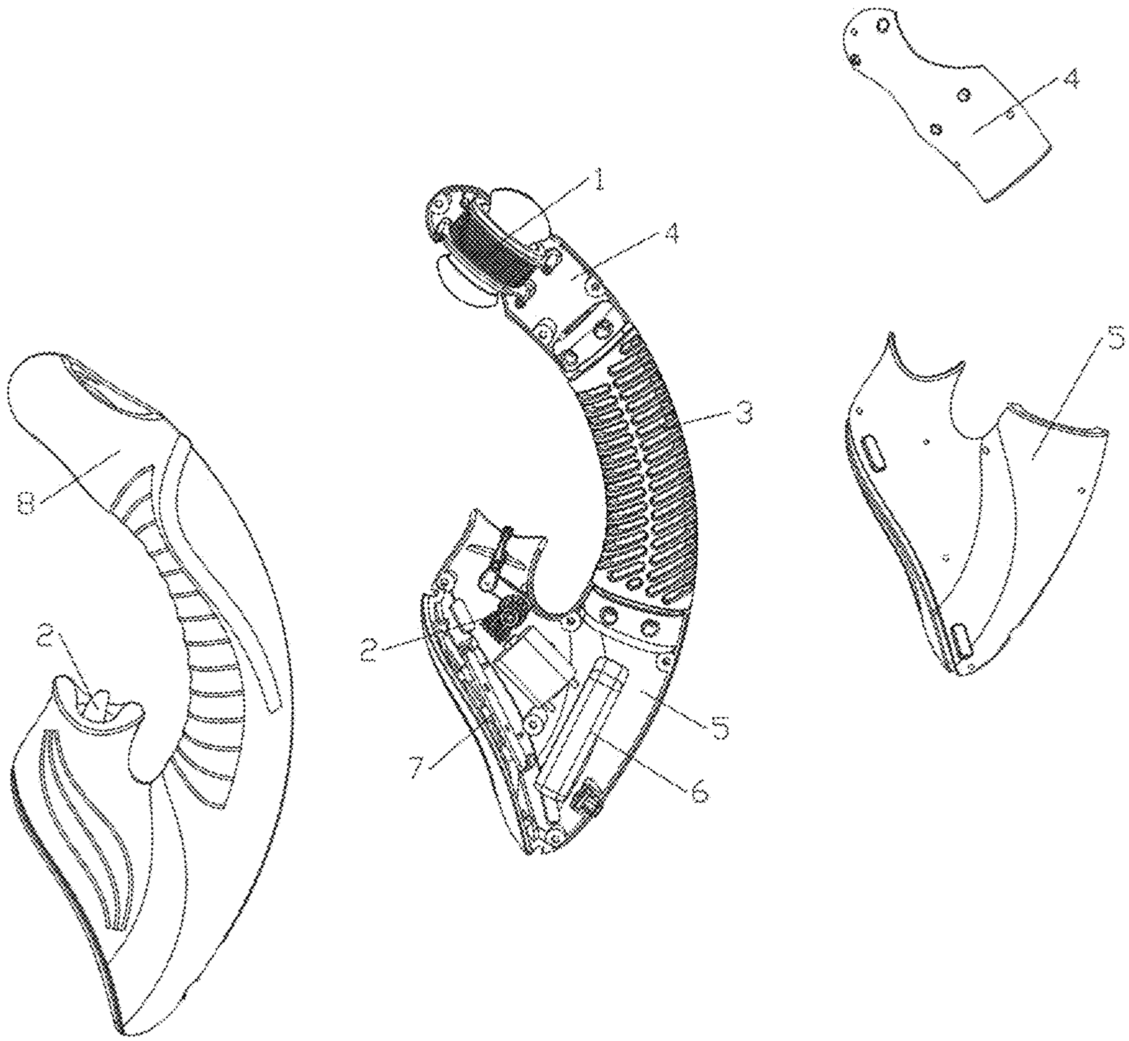
FIG. 4 is an explosion view of the magnetic pulse reciprocating motion type massager of the invention
Figure 5:
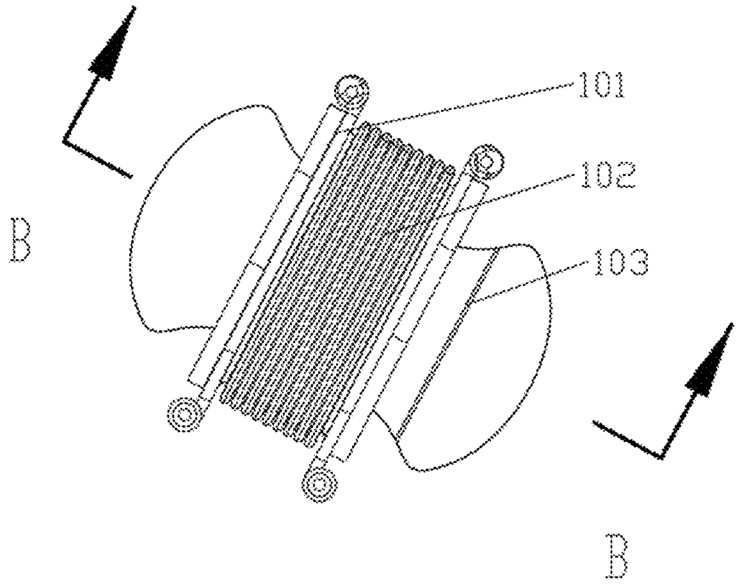
FIG. 5 is a structural view of the magnetic pulse jumping mechanism of the invention.
Figure 6:
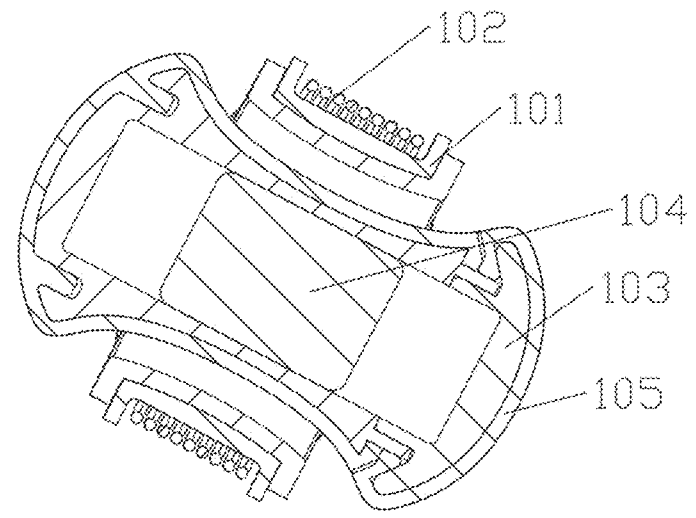
FIG. 6 is a B-B sectional view of FIG. 5.
Figure 7:
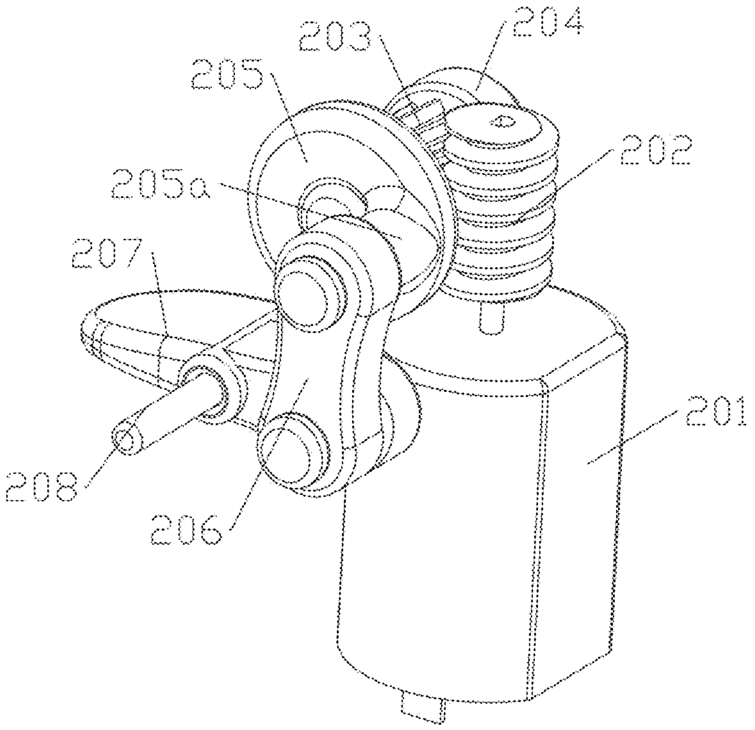
FIG. 7 is a structural view of the magnetic pulse jumping mechanism of the invention.
Figure 8:
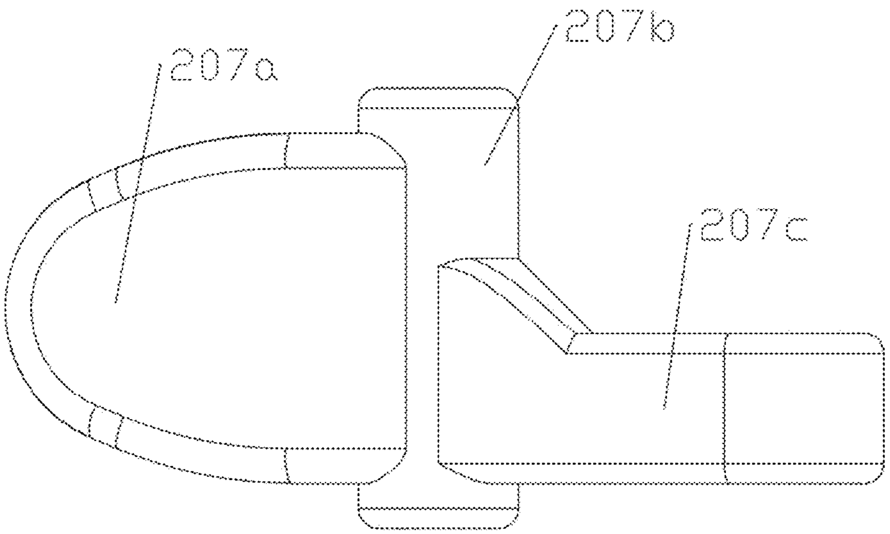
FIG. 8 is a structural view of the tongue piece of the swinging massage mechanism of the invention.
Figure 9:
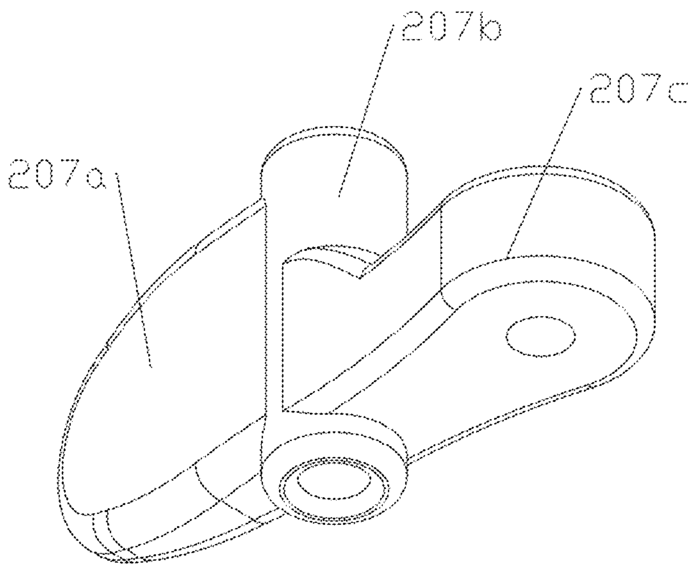
FIG. 9 is a stereoscopic view of the tongue piece of the oscillating massage mechanism of the invention.

1. magnetic pulse beating mechanism; 101, ring holder; 102, coil; 103, movable shell; 104, magnet; 105, silicone sleeve; 2, swinging massage mechanism; 201, motor; 202, screw; 203, gear; 204, bearing; 205, crank; 205*a*, crank arm; 206, connecting rod; 207, tongue slice; 207*a*, tongue body; 207*b*, shaft sleeve; 207*c*, connecting part; 208, rotating shaft; 3, massage body; 4. Front shell; 5. Rear shell; 6. Battery; 7, control circuit board; 8, silicone shell.

SPECIFIC IMPLEMENTATION MODE

In order to make the purpose, technical scheme and advantages of the invention more clear, the following is the detailed description of the technical scheme of this invention. Obviously, the embodiments described are only partial embodiments of the invention and not all embodiments. Based on the embodiments of the invention, all other embodiments obtained by ordinary technicians in the field without making creative labor belong to the scope protected by the invention.

As shown in Picture No. 1-9, the invention provides a magnetic pulse reciprocating motion massager, comprising a massage body 3. The front end of the massage body 3 is connected with a front shell 4, and the back end is connected with a rear shell 5; The front shell 4 is provided with a magnetic pulse beating mechanism 1 capable of reciprocating motion, and the two ends of the magnetic pulse beating mechanism 1 extend out both sides of the front shell 4.

Among them, the implementation of the magnetic pulse beating mechanism 1 is as follows:

Example No. 1

Referring to Picture No. 5 and No. 6, the magnetic pulse beating mechanism 1 comprises a ring holder 101, a movable housing 103 and a magnet 104, and the ring cage 101 is fixed connected with the front housing 4, and the ring cage 101 is fixed connected with the front housing 4 by screws. A coil 102 is wound on the ring cage 101, and the middle part of the movable shell 103 is arranged on the inner side of the ring cage 101; The movable shell 103 is a spindle shape with two large ends and a thin middle part, and the two ends with large size are located on both sides of the ring holder 101. The movable shell 103 is provided with a sliding channel along its axis, and the magnet 104 is arranged in the sliding channel and can move reciprocally along the sliding channel. One end of the movable housing 103 is provided with a removable end cover to facilitate the installation of magnet 104. The coil 102 is provided with pulsed current by the control circuit board 7, and the coil 102 generates a magnetic field, which drives the magnet 104 to move linearly in the sliding channel, thereby driving the movable shell 103 to move around the opening of the front shell 4, so as to achieve the massage effect.

Further, the outer side of the movable housing 103 is wrapped with a silicone sleeve 105, which can improve the comfort of use.

Example No. 2

The magnetic pulse beating mechanism 1 comprises a ring holder 101 and a silicone sleeve 105. The ring holder 101 is fixedly connected with the front shell 4, and a coil 102 is wound on the ring cage 101; The silicone sleeve 105 activity is arranged on the inside of the ring holder 101, and the silicone sleeve 105 is provided with a magnet 104 capable of reciprocating motion.

Unlike Embodiment 1, magnet 104 can be placed directly into the silicone sleeve 105 and reciprocated on the inside of the ring holder 101.

Further, the rear housing 5 is provided with a control circuit board 7 and a battery 6, the control circuit board 7 is connected with the coil 102, the battery 6 is connected with the control circuit board 7; The battery 6 outputs a DC current to the control circuit board 7, the control circuit board 7 outputs a pulsating current to the coil 102, and the coil 102 cuts a magnetic drive magnet 104 to reciprocate.

By controlling the circuit board 7 output pulse current to the coil 102 cut the ring center magnet 104 magnetic field, so that the magnetic pulse pulsing mechanism of the massager 1 do linear reciprocating movement, can move up and down or left and right before and after four directions eccentric swing, compared with the traditional vibration and other motion methods more close to the user mode of movement more linear.

The front shell 4 in the structure comprises a first shell and a second shell, the second shell is clamped with the first shell, and the first shell and the second shell are provided with a gap corresponding to the clamping to form a magnetic pulse beating mechanism 1 at both ends of the opening, the structure can facilitate the installation of magnetic pulse beating mechanism 1.

For further information, please look at picture No. 7-9, a swinging massage mechanism 2 is also installed in the rear shell 5.

As the preferred embodiment of the case, the oscillating massage mechanism 2 comprises a motor 201, a screw 202, a gear 203, a crank 205, a connecting rod 206 and a tongue 207; The output shaft of the motor 201 is connected with the screw 202, the screw 202 is engaged with the gear 203, one end of the gear 203 is rotated and connected with the rear housing 5, the other end is connected with the crank 205, the eccentric position of the crank 205 is connected with the connecting rod 206 through the crank arm 205*a*. The other end of the connecting rod 206 is connected with the tongue piece 207, and the tongue piece 207 is assembled with the rear housing 5 through the rotating shaft 208, and the tongue piece 207 extends out of the opening of the housing; The connecting rod 206 reciprocates with the rotation of the crank 205 and drives the tongue piece 207 to swing or snap back and forth. The motor 201 drives the screw 202 to rotate axially, thereby driving the gear 203 to drive the crank 205 to rotate, and the connecting rod 206 connected to the crank arm 205*a* reciprocates with the rotation of the crank 205, through the reciprocating motion of the connecting rod 206 to drive the tongue 207 connected to the shell through the rotating shaft 208 to achieve left and right or up and down swing or snap, To enhance the massager user experience.

As a preferred option, the tongue piece 207 comprises a tongue piece body 207*a*, a rotating shaft sleeve 207*b* and a connecting part 207*c*, and the tongue piece body 207*a*, a rotating shaft sleeve 207*b* and a connecting part 207*c* are integrated; The connecting part 207*c* is connected with the connecting rod 206 through the connecting pin, the rotating shaft sleeve 207*b* is rotationally connected with the rotating shaft 208, and the tongue piece body 207*a* is a lingual protruding the rear housing 5 opening outside. The tongue body 207*a* can swing or snap outside the housing 5 by the drive of the connecting rod 206206, so that it can be used to stimulate the massage site. The gear 203 is rotationally connected with the rear housing 5 through the bearing 204.

As a preferred option, the crank 205 is integrated with the crank 205 arm, the connecting rod 206 is connected with the crank 205 arm through a connecting pin, and the crank 205 is connected with the gear 203 through a fixing screw. The motor 201 adopts a DC motor 201.

In order to improve comfort, the outer sides of the front shell 4, the massage body 3 and the rear shell 5 are wrapped with a silicone shell 8.

The above is only the specific embodiment of the invention, but the scope of protection of the invention is not limited to this, and any technical personnel who are familiar with the technical field can easily think of changes or replacements within the technical scope disclosed by the invention shall be covered by the scope of protection of the invention. Therefore, the scope of protection of the invention shall be subject to the scope of protection claimed by the claim right.

The invention claimed is:

1. A reciprocating magnetic pulse type massager having: a massage body having a front end connected with a front shell of the massager and a back end connected with a rear shell of the massager;

wherein the front shell has a first side and a second side wherein the first side of the front shell has an opening and wherein the second side of the front shell has an opening;

the front shell having an interior having a magnetic pulse beating mechanism capable of doing reciprocating motion wherein the magnetic pulse beating mechanism has a first side and a second side and wherein the first side of the magnetic pulse beating mechanism extends out of the opening of the first side of the front shell and wherein the second side of the magnetic pulse beating mechanism extends out of the opening of the second side of the front shell.

2. The magnetic pulse reciprocating type massager of claim 1 is further characterized in that the magnetic pulse beating mechanism comprises a ring cage, a movable shell and a magnet, the ring cage is fixed and connected with the front shell, and the ring cage is wound with a coil, and a middle part of the movable shell is arranged on an inside of the ring cage;

the movable shell is provided with a sliding channel along its axis, and the magnet is installed in the sliding channel and can move reciprocally along the sliding channel.

3. The magnetic pulse reciprocating type massager of claim 2 is further characterized in that an outer side of the movable shell is wrapped with a silicone sleeve.

4. The magnetic pulse reciprocating type massager of claim 2 is further characterized in that the movable shell is a spindle shape which has two ends and a middle; each end having a larger diameter than the middle the two ends are located on both sides of the ring holder.

5. The magnetic pulse reciprocating type massager of claim 4 is further characterized in that one end of the movable shell is installed with a removable end cover.

6. The magnetic pulse reciprocating movement type massager of claim 1 is further characterized in that the magnetic pulse beating mechanism comprises a ring holder and a silicone sleeve;

the ring holder, twined with a coil, is fixed and connected with the front shell;

the silicone component is arranged to do motion on the inside of the ring holder, and the silicone sleeve is provided with a magnet capable of reciprocating movement.

7. The magnetic pulse reciprocating type massager of claim 6 is further characterized in that a control circuit board and a battery are arranged in the rear housing, the control circuit board is connected with the coil, and the battery is connected with the control circuit board;

the battery generates DC current to the control circuit board, and the control circuit board generates pulsating current to the coil to the drive magnet doing reciprocating movement.

8. The magnetic pulse reciprocating movement massager of claim 1 is further characterized in that the front shell comprises a first shell and a second shell, the second shell is connected with the first shell, and the first shell and the second shell are provided with an opening, and the magnetic pulse pulsing mechanism is formed after clamping the opening at both ends.

9. The magnetic pulse reciprocating type massager of claim 1 is further characterized in that a swinging type massager mechanism is also installed in the rear shell.

10. The magnetic pulse reciprocating motion massager of claim 9 is further characterized in that the swinging massage mechanism comprises a motor, a screw, a gear, a crank, a connecting rod and a tongue;

the output shaft of the motor is connected with the screw meshed with a gear, one end of the gear is connected with the rear shell, the other end is connected with the crank, the eccentric position of the crank is connected with one end of the connecting rod through a crank arm, the other end of the connecting rod is connected with the tongue, and the tongue is assembled with the rear housing through a rotating shaft, the tongue extends out of an opening of the rear shell; the connecting rod reciprocates with the rotation of the crank and drives the tongue to swing or snap back and forth.

11. The magnetic pulse reciprocating type massager of claim 10 is further characterized in that the tongue piece comprises a tongue piece body, a shaft sleeve and a connecting part, and the tongue piece body, a shaft sleeve and a connecting part are formed as one;

wherein, the connecting part is connected with the connecting rod through a connecting pin, the rotating shaft sleeve is rotatively connected with the rotating shaft, and the body of the tongue is shaped to extend the rear shell opening outside.

12. The magnetic pulse reciprocating type massager of claim 11 is further characterized in that the gear is connected with the rear housing through a bearing.

13. The magnetic pulse reciprocating type massager of claim 11 is further characterized in that the crank and the crank arm are formed in unibody, the connecting rod is connected with the crank arm through the connecting pin, and the crank is connected with the gear through the a fixing screw.

14. The magnetic pulse reciprocating type massager of claim 11 wherein the magnetic pulse reciprocating motion massager is characterized in that the motor adopts a DC motor.

15. The magnetic pulse reciprocating type massager of claim 1 is further characterized in that the front shell, the massage body and the outer side of the rear shell are wrapped with a silicone shell.

16. A reciprocating magnetic pulse type massager, which is characterized in that a front end of the massage body is connected with a front shell and a back end is connected with a rear shell;

a first end and a second end of the magnetic pulse beating mechanism;

a front shell having a first side and a second side;

the front shell is installed with a magnetic pulse beating mechanism, capable of doing reciprocating motion, and the two ends of this magnetic pulse beating mechanism extend out of the two sides of the front shell;

a ring cage, a movable shell and a magnet, the ring cage is fixed and connected with the front shell, and the ring cage is wound with a coil, and a middle part of the movable shell is arranged on an inside of the ring cage; and the movable shell is provided with a sliding channel along its axis, and the magnet is installed in the sliding channel and can move reciprocally along the sliding channel.

17. The magnetic pulse reciprocating type massager of claim 16 is further characterized in that an outer side of the movable shell is wrapped with a silicone sleeve.

18. The magnetic pulse reciprocating type massager of claim 16 is further characterized in that the movable shell is a spindle shape which has two ends and a middle; each end having a larger diameter than the middle the two ends are located on both sides of the ring holder.

19. The magnetic pulse reciprocating type massager of claim 18 is further characterized in that one end of the movable shell is installed with a removable end cover.

20. The magnetic pulse reciprocating movement type massager of claim 16 is further characterized in that the magnetic pulse beating mechanism comprises a ring holder and a silicone sleeve;

the ring holder, twined with a coil, is fixed and connected with the front shell;

the silicone component is arranged to do motion on the inside of the ring holder, and the silicone sleeve is provided with a magnet capable of reciprocating movement.

21. The magnetic pulse reciprocating type massager of claim 20 is further characterized in that a control circuit board and a battery are arranged in the rear housing, the control circuit board is connected with the coil, and the battery is connected with the control circuit board;

the battery generates DC current to the control circuit board, and the control circuit board generates pulsating current to the coil to the drive magnet doing reciprocating movement.

* * * * *